(12) United States Patent
Pinheiro et al.

(10) Patent No.: US 11,133,857 B2
(45) Date of Patent: Sep. 28, 2021

(54) RELAY SELECTION FOR COMMUNICATION IN MULTI-RAT ENVIRONMENT

(71) Applicant: Intel IP Corporation, Santa Clara, CA (US)

(72) Inventors: Ana Lucia A. Pinheiro, Hillsboro, OR (US); Dave Cavalcanti, Portland, OR (US); Meghashree Dattatri Kedalagudde, Portland, OR (US); Ranganadh Karella, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/489,832

(22) PCT Filed: Mar. 29, 2017

(86) PCT No.: PCT/US2017/024731
§ 371 (c)(1),
(2) Date: Aug. 29, 2019

(87) PCT Pub. No.: WO2018/182592
PCT Pub. Date: Oct. 4, 2018

(65) Prior Publication Data
US 2020/0021355 A1    Jan. 16, 2020

(51) Int. Cl.
*H04B 7/155* (2006.01)
*H04W 76/14* (2018.01)
*H04W 36/00* (2009.01)
*H04W 48/16* (2009.01)
*H04W 48/20* (2009.01)
*H04W 4/44* (2018.01)

(52) U.S. Cl.
CPC .... *H04B 7/15528* (2013.01); *H04W 36/0022* (2013.01); *H04W 48/16* (2013.01); *H04W 48/20* (2013.01); *H04W 76/14* (2018.02); *H04W 4/44* (2018.02)

(58) Field of Classification Search
CPC .................................................. H04B 7/15528
See application file for complete search history.

(56) References Cited

U.S. PATENT DOCUMENTS

| | | | |
|---|---|---|---|
| 2004/0052273 A1* | 3/2004 | Karaoguz | H04L 47/41 370/465 |
| 2011/0013539 A1* | 1/2011 | Ayyagari | H04L 45/64 370/254 |

(Continued)

OTHER PUBLICATIONS

International Search Report dated Jan. 18, 2018 for International Application No. PCT/US2017/024731.
(Continued)

*Primary Examiner* — John D Blanton
(74) *Attorney, Agent, or Firm* — 2SPL Patent Attorneys PartG mbB; Yong Beom Hwang

(57) ABSTRACT

A method configured to selectively retransmit a message includes analyzing a message received by a device to determine a set of radio access technologies (RATs) in which the message has been transmitted. If the device supports a device RAT that is different from set of RATS the message is updated to include the device RAT and the updated message is transmitted using the device RAT.

19 Claims, 5 Drawing Sheets

(56) References Cited

U.S. PATENT DOCUMENTS

| | | | |
|---|---|---|---|
| 2014/0036762 A1 | 2/2014 | Al-Shalash | |
| 2015/0172424 A1* | 6/2015 | Sone | H04L 69/08 |
| | | | 370/401 |
| 2016/0174106 A1* | 6/2016 | Lee | H04W 40/20 |
| | | | 705/14.63 |
| 2017/0279894 A1* | 9/2017 | Chen | H04L 69/18 |

OTHER PUBLICATIONS

International Preliminary Report on Patentability dated Oct. 1, 2019 for International Application No. PCT/US2017/024731.

* cited by examiner

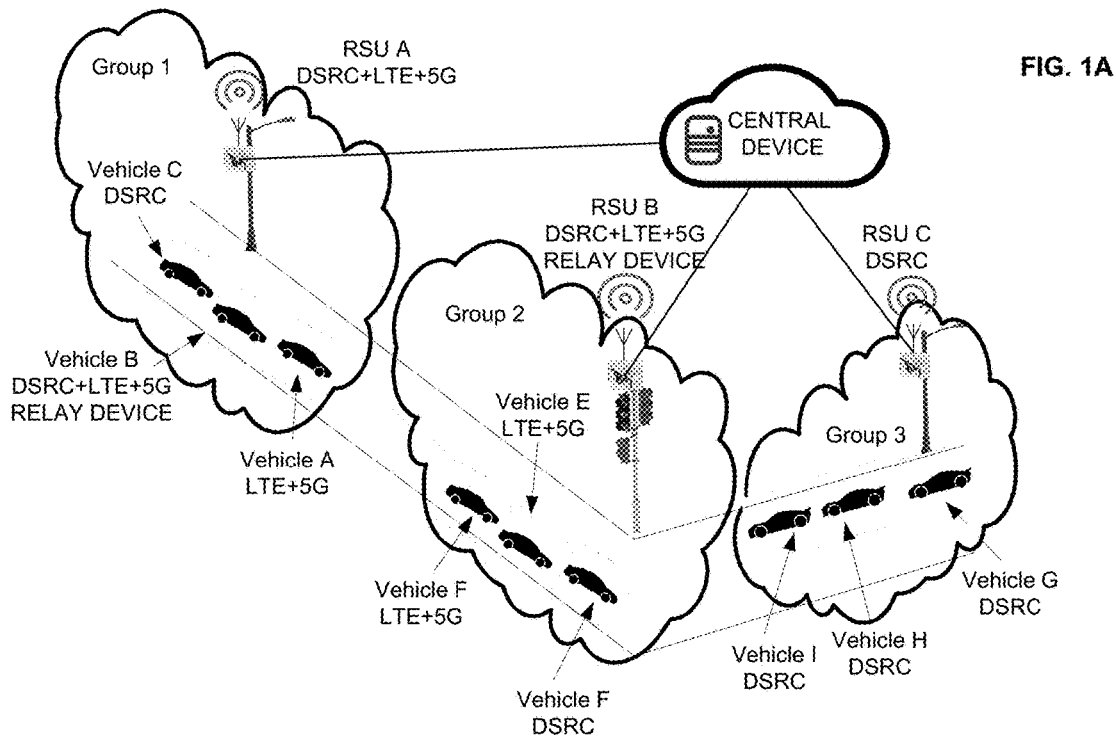
FIG. 1A
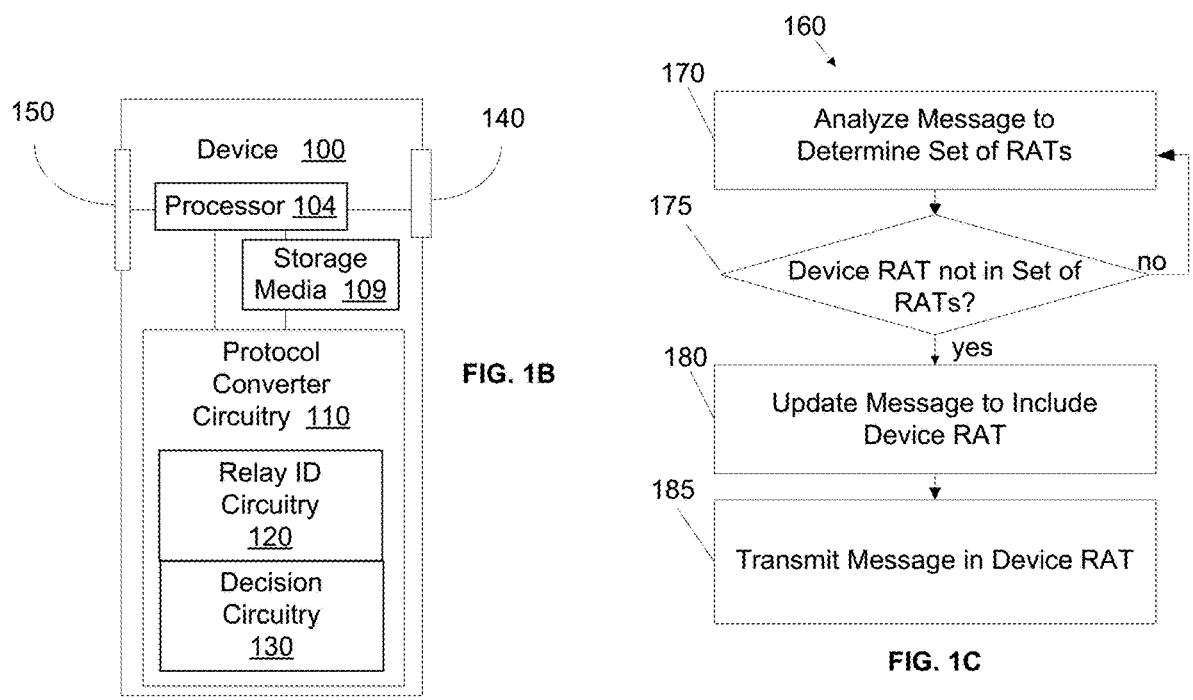
FIG. 1B
FIG. 1C

RELAY SELECTION FOR COMMUNICATION IN MULTI-RAT ENVIRONMENT

This application is a National Phase entry application of International Patent Application No. PCT/US2017/024731 filed Mar. 29, 2017 and is hereby incorporated by reference in its entirety.

FIELD

The present disclosure relates to the field of wireless communications and in particular to applications including, but not limited to, applications related to the Internet of Things (IoT) and Vehicle to Everything (V2X), Cellular, Multi-Fire, WiFi, WiGig, sensor networks, mesh networks, and so on.

BACKGROUND

IoT and V2X applications typically involve wireless communications between devices without human intervention. Cooperative driving is one example of an IoT application in which vehicles share their intentions with other nearby vehicles, roadway infrastructure, or even pedestrians. Such information is used by automated driving algorithms to enable accurate prediction of what others will do in the near future, and by doing so optimize their own decisions. In synchronized cooperation, autonomous vehicles exchange messages and synchronize their planned trajectories to optimize driving patterns.

Modern communication devices are capable of radio communication using one or more radio access technologies (RATs). A RAT is a communication protocol according to some standard. Examples of RATs include cell-based RATs such as LTE and 5G that communicated in a manner that is coordinated in some way by a cellular network (e.g., either in resource allocation and/or using an evolved node B (eNB) as an intermediary. Radio based RATs include 802.11p based dedicated short range communication (DSRC) techniques that communicate directly (without intervention or assistance by the cell network) between devices using some predesignated band. Communication systems based on the different RATs may be operating on the same spectrum bands or different spectrum bands.

BRIEF DESCRIPTION OF THE DRAWINGS

Some examples of circuits, apparatuses and/or methods will be described in the following by way of example only. In this context, reference will be made to the accompanying Figures.

FIG. 1A illustrates a vehicle communication environment in which some devices are functioning as relay devices for forwarding or retransmitting V2X messages in additional radio access technologies (RATs).

FIG. 1B illustrates an exemplary device that includes protocol converter circuitry that enables the device to function as a relay device.

FIG. 1C illustrates an exemplary method that performed by a relay device.

DETAILED DESCRIPTION

Figure 2:
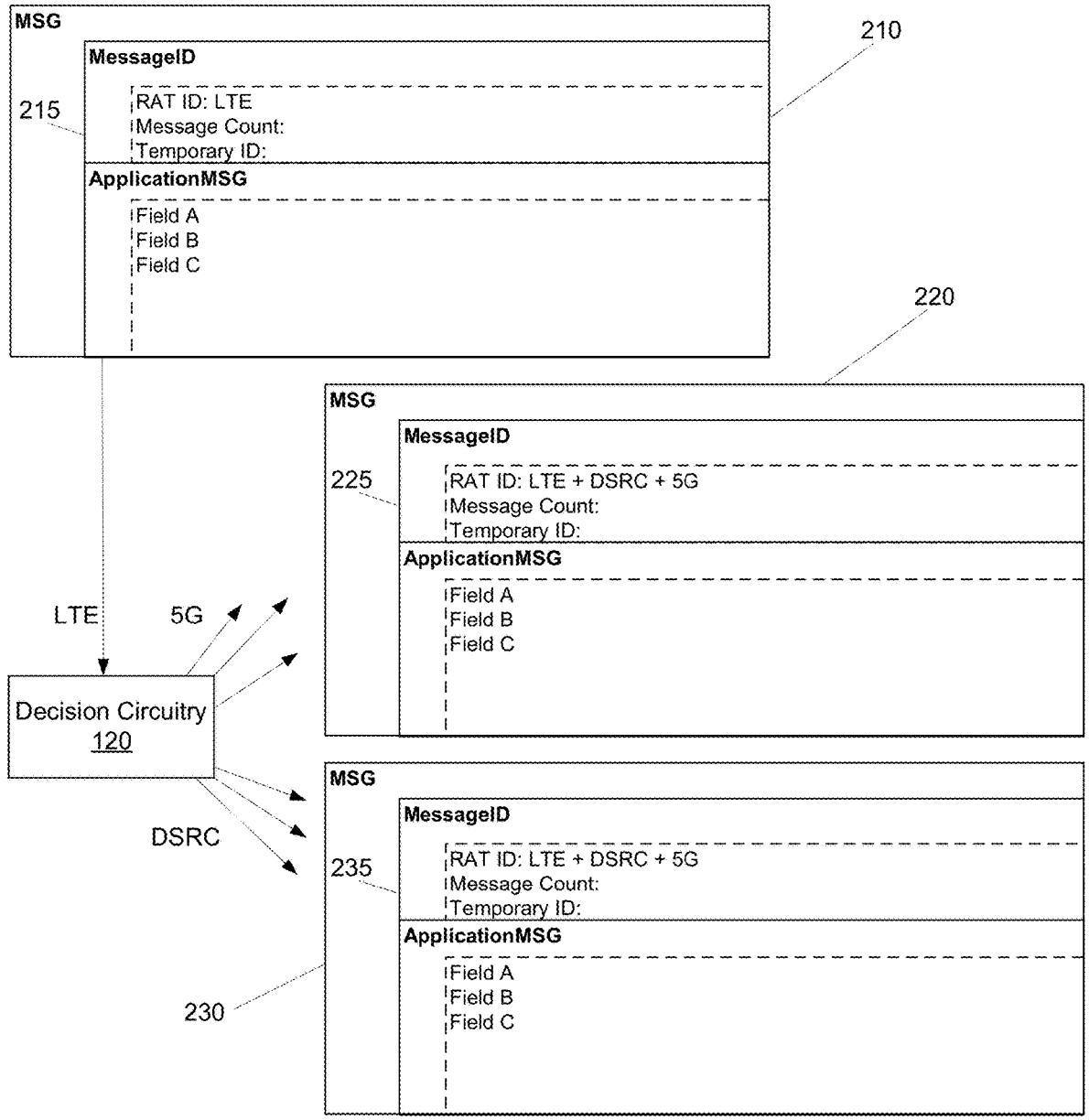
FIG. 2 illustrates, schematically, an exemplary decision circuity in a relay device retransmitting a message.

Intelligent Transportation Systems (ITS) enabled by connected vehicles can improve safety and efficiency in roadways. The DSRC (Dedicated Short Range Communication) and ETSI ITS G5 suite of protocols have been developed based on 802.11 standards, adding modifications to the exchange of safety-related messages between vehicles and vehicles and road side units (RSU). Most ITS applications rely on the concept of situation or co-operative awareness, which is based on periodic and event-driven broadcast of basic safety messages (BSM) between vehicles (V2V), vehicles and infrastructure (V2I), vehicles and pedestrians (V2P). These short messages are mostly useful locally to identify situations that require action (e.g. collision warning, emergency stop, pre-crash warning, etc.) within very short intervals (e.g. 20 to 100 msec). As such, minimizing the overhead involved in enabling scalable transmission and reception of BSMs is one of the challenges to support V2X (V2V, V2I and V2P).

Vehicles that can participate in collaborative or coordinated communication environment (e.g., a V2X cell) include at least one radio that supports at least one RAT. A RAT may be a D2D RAT or a cell-based RAT. D2D RATs communicate between devices without intervention by an access point or base station (e.g., an evolved node B (eNB) in a cellular network). D2D RATs include, for example, LTE-D2D, 5G-D2D, and DSRC. LTE-D2D and 5G-D2D utilize resources allocated to them by a base station (e.g., eNB) in a cellular network to communicate directly between devices. One modern D2D RAT is dedicated short-range communication (DSRC). DSRC is a short to medium range communication service in the range of 5.850 to 5.925 GHz in North America. DSRC supports RSU to vehicle and vehicle to vehicle communication. DSRC typically provides fairly high data transfer rates with minimal latency and has a range of about 1000 meters. DSRC data rates range between about 6 to about 27 Mbps. DSRC has a safety control channel dedicated to V2X messages. Rather than requesting resources, as is done with cellular RATs, such as LTE and 5G, in DSRC the device contends for the DSRC channel with other devices and applications. DSRC encompasses the 802.11p radio access technology and the higher layers of the stack as defined by the IEEE 1609 suite of protocols.

Cell-based RATs communicate between devices using an intermediary base station (e.g., eNB in a cellular network or an access point (AP) in a wireless local area network (WLAN)). In addition to transmitting messages from one device to another, the base station allocates network resources in the cell and may control other aspects of communication between the devices in the cell. Cell-based RATs include, for example, WiFi, 3G, LTE, 5G, UMTS, HSUPA, GSM, and so on.

Lately the cell-based protocols defined in 3GPP are being enhanced to support V2X communications and their required KPIs. V2X communications are part of work items in 3GPP SA and RAN, including proposed enhancements for the device-to-device (D2D) communication interface in order to support the service requirements associated with V2V. As part of 5G, V2X is also considered a major important use case, and it is currently being studied in NGMN and 3GPP.

In the future, V2X communications may be supported by a combination of radio and cell-based RATs systems. V2X devices may be equipped with multiple radios operating in different spectrum bands and thus each device will support one or more RAT. One issue that arises as communication technology involved in V2X systems evolves is how to deal with different RAT capabilities of different devices. For example if a BSM is transmitted by a device using the 5G RAT, how can the important message be received by a device that does not have 5G RAT capabilities? Described herein are devices, systems, and methods configured to enable relay devices to serve as protocol converters that convert and retransmit messages in different RATs to support cooperative driving.

For the purposes of this description the term "message" is used as shorthand for any type message that is sent by some or all vehicles or devices in a group that would benefit from the relay selection and retransmitting techniques described herein. Further, the term "vehicle" will be used interchangeably with the term "device" as the relay selection and the retransmission of messages by the relay device will be described in the context of cooperative driving. The term vehicle need not be limited to a passenger carrying vehicle, in some examples, a vehicle is a drone, an IoT device, or any other autonomous device that moves or participates in the moving of some payload. The term "device" is to be understood as including both devices (e.g., mobile communication devices, user equipment (UE) devices, and so on) in their traditional sense as well as devices such as roadside units (RSUs) that participate in the messaging involved with V2X applications but are not themselves associated with any particular user. It is to be understood that the relay selection and message retransmission techniques described herein may be performed by any device (i.e., including devices not installed in a vehicle or RSU), such as any mobile communication devices, where beneficial.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," "circuitry", and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

FIG. 1A illustrates the concept of how relay devices can support collaborative driving. Three groups of devices are illustrated (including vehicles and RSUs) that each support one or more RAT. The RSUs are controlled by a central device or node, which may be in communication with a traffic control "core" network or server. The vehicles are each equipped with at least one radio supporting at least one RAT. The groups include devices that are proximate to one another, but the groups are not limited to devices that are in a collaborative or coordinated driving group, such as a platoon on convoy, with one another. Within each group, at least one device is designated as a "relay" device that serves as a message protocol converter for other devices in the group. For example, in Group 1, Vehicle B is designated as the relay device because Vehicle B supports three RATs (DSRC, LTE, and 5G), which is the most RATs of any device in the group. Note that while the RSU A also supports the same three RATs as Vehicle B, RSU A has not been designated as the relay device for Group 1 for any number of reasons that will be described in more detail below. In Group 2, RSU B has been designated as the relay device. In group 3 no relay device is necessary because all devices in the group support the same single RAT, DSRC.

As relay device, Vehicle B serves as a protocol converter, meaning that when Vehicle B receives a message that was transmitted using some RAT or RATs, Vehicle B will convert and retransmit that message in at least one different RAT so that other devices in the group that don't support the original RAT(s) can receive the message. For example, if Vehicle C transmits a BSM using DSRC, Vehicle A would be unable to receive the BSM because Vehicle C only supports LTE and 5G RATs. Vehicle B, acting as relay device, converts the message to either or both LTE and 5G and retransmits the message in the selected RAT(s) so that Vehicle A can receive the message. Of course, as the vehicles move through the area, different devices may be selected as relay devices according to one of three different selection modes: device collaborative, central control, and independent. Before discussing how the selection of relay device is made in these three different modes, a description of the functions performed by the relay device, however selected, will be provided.

FIG. 1B illustrates an exemplary architecture for a device 100 that supports relay selection and also retransmission of messages in V2X systems. The device 100 includes a processor 104, storage media 109, and a protocol converter circuitry 110. The protocol converter circuitry includes relay identification (ID) circuitry 120 configured to control the device 100 to participate in relay device selection. The protocol converter circuitry also includes decision circuitry 130 configured to control the device function as a relay device. As used herein, the term "circuitry" may refer to, be part of, or include an Application Specific Integrated Circuit (ASIC), an electronic circuit, a processor (shared, dedicated, or group, e.g., processor 104), and/or memory (shared, dedicated, or group, e.g., storage media 109) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The processor 104 may be configured to cooperate with the storage media 109 and/or the protocol converter circuitry 110 to provide higher-layer operations that include generating and processing signals encoding messages transmitted by the device. For example, the protocol converter circuitry 110 may control the processor 104 to convert a message in a manner that makes it suitable for retransmission using a particular RAT that is selected by the decision circuitry 130. This conversion may include manipulating or updating data in the message, such as a header field, and also controlling transmission parameters such as frequency and so on, of the device when the device retransmits message. The processor 104 may include one or more single-core or multi-core processors. The processor may include any combination of general-purpose processors and dedicated processors including, for example, digital signal processors (DSPs), central processing units (CPUs), microprocessors, memory controllers (integrated or discrete), etc.

The storage media 109 may be used to load and store data or instructions (collectively "logic") for operations performed by the processor 104. The instructions may include instructions that cause the device to select or self-designate a relay device in a group of devices, determine whether to retransmit a message, and/or retransmit the message in a selected RAT. The storage media 109 may include any combination of suitable volatile memory and non-volatile memory. The storage media may include any combination of various levels of memory/storage including, but not limited to, read-only memory (ROM) having embedded software instructions (e.g., firmware), random access memory (e.g., dynamic random access memory (DRAM)), cache, buffers, etc. The storage media may be shared among the various processors or dedicated to particular processors. In some embodiments, one or more of the processors may be combined with one or more storage media and, possibly other circuitry in a single chip, a single chipset, or disposed on a same circuit board in some embodiments.

The device 100 is able to communicate with other devices in device-to-device mode (also called Peer-to-Peer (P2P) mode) over a device-to-device interface circuitry 140. Note that the device-to-device interface circuitry 140 may be an interface configured to communicate according to 802.11 p (e.g., DSRC), an enhancement of an existing LTE ProSe PC5 interface, a new ProSe interface defined for 5G systems, a WiFi interface, Bluetooth interface, or an interface for any other version of Wireless Personal Area Networks or Wireless Local Area Networks. The device 100 may also include cellular interface circuitry 150 that enables the device to communicate with an eNB or access point/base station. The cellular interface circuitry 150 may be a new fifth generation (5G) interface or it may be an enhancement of existing LTE Uu-interface.

The protocol converter circuitry 110 is capable of controlling the device 100 to utilize the interface circuitries 140 and 150 to communicate with other devices using appropriate networking communication protocols. For example, device-to-device communication by way of the device-to-device interface circuitry 140 may be performed in a designated frequency band, such as about 5-6 GHz and in accordance with a selected communication protocol suited for such communication. The cellular interface circuitry 150 may be used to communicate in a different frequency band using a different communication protocol. Either of the interface circuitry 140 or 150 may be capable of communicating using any number of radio access technologies (RATs). In some embodiments, the interface circuitry 140 or 150 may communicate over Ethernet or other computer networking technologies.

The decision circuitry 130 is configured to control the device 100 to operate as a relay device when the device 100 has been designated or has self-designated as a relay device. FIG. 1C illustrates an exemplary method 160 that may be performed by the decision circuitry 130 in a device that has been designated relay device. At 170, the method includes analyzing a message received by device to determine a set of radio access technologies (RATs) in which the message is transmitted. One example of this analyzing operation is illustrated in FIG. 2 in which a header 215 (or field) that precedes an application layer BSM 210 includes data (e.g., a bitmap or a coded field) that describes the RAT in which the message has already been transmitted (i.e., LTE in the illustrated example). The decision circuitry 130 is configured to parse or read the header 215 (or any other field that has been designated per the V2X application as encoding this information) of the received BSM 210 to identify the RAT or RATs listed.

While in FIG. 2, the header 215 of the application message records the set of RATs, in some examples, rather than at the application layer, the decision circuitry 130 may be implemented in either the physical (PHY) layer or the media access control (MAC) layer or any other layer above the MAC and under the application (e.g. network, transport, adaptation layers) of the device 100. The selection of protocol layer implementing the decision circuitry would determine what part of the message encodes the set of RATs used to transmit the message. Thus, while FIG. 2 illustrates the set of RATs being recorded in the header of the application layer message, the set of RATs may be included in the header of a lower layer of the protocol stack, meaning that the application layer header 215 could itself be unaffected in some examples.

At 175, a determination is made as to whether the device supports a RAT (hereinafter a "device RAT") that is different from (not included in) the set of RATs in the message. When the device supports a device RAT that is not in the set of RATS at 180, the message is updated to include the device RAT. This operation can be seen in FIG. 2 in which a message header 225, 235 of retransmitted messages 220 and 230 is a modified version of the header of the original message that now includes 5G and DSRC. Of course, as discussed above with reference to 170, another header of a lower layer or even another field of the message that records the set of RATs may be modified instead of an application layer message header. At 185, the updated message is retransmitted using the device RATs that were not in the set of original RATs. In FIG. 2 it can be seen that the device (as controlled by decision circuitry 130/protocol converter circuitry 110) transmits a 5G version of the message 220 and a DSRC version of the message 230.

Including information in a message about what RATs have been used to transmit the message is useful in reducing unnecessary re-transmission of a message. However, in one example, the relay device simply re-transmits every message it receives in every RAT that it supports. Other information may also be included in the message itself that may be considered by the decision circuitry 130 in determining whether to re-transmit a message such as an initial position of the original sender of the message, a radius of interest for the message, the time the message was sent, an expiration time for the message after which the message should not be re-transmitted, and a sequence number that records a number of times the message has been transmitted. For example, the decision circuitry 130 may determine not to retransmit if the device is outside the radius of interest or too far from the original position of the message sender, or if the message has already been transmitted some number of times.

Figure 3:
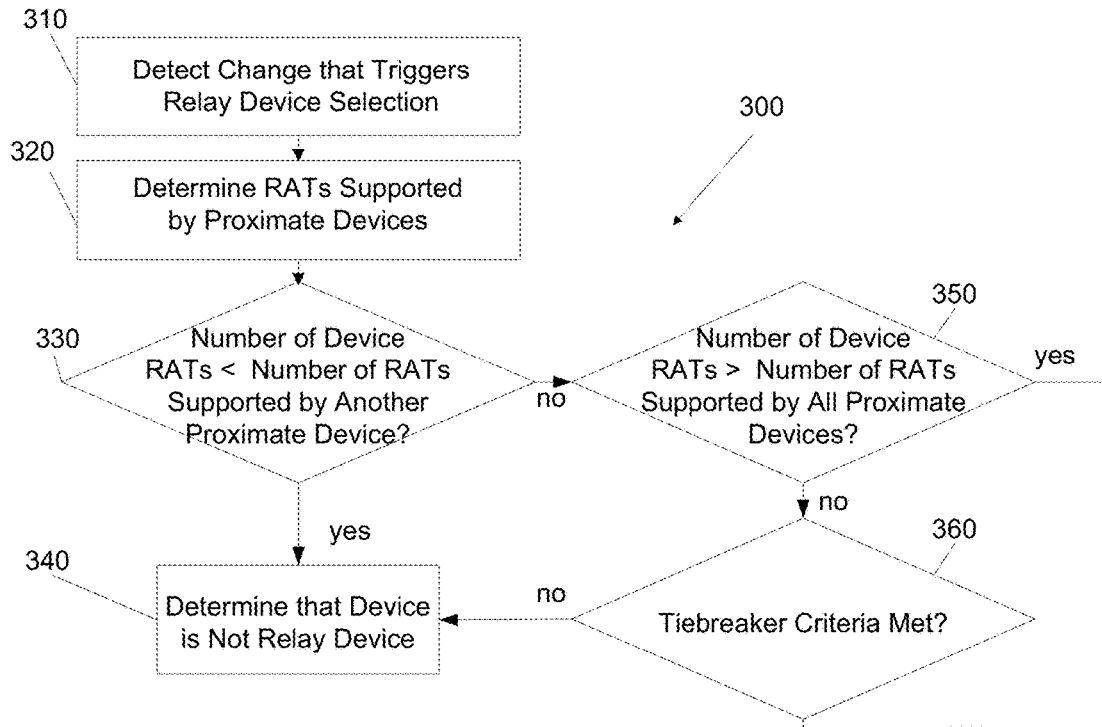
FIG. 3 illustrates an exemplary method that may be performed by a device when operating in a collaborative mode for determining whether or not the device is a relay device.

In some examples, the device has knowledge of the RAT capabilities of other proximate devices (see FIG. 3). If this is the case, then the decision circuitry 130 may retransmit the message using only those RATs that are supported by other proximate devices. When the device has self-designated as relay device (e.g., when the device is operating in independent mode), the decision circuitry 130 may decide not to retransmit a message, even when the message has not yet been transmitted in a RAT supported by the device, based on retransmission criterion as will be described with reference to FIG. 4.

Returning briefly to FIG. 1B, the relay ID circuitry 120 is configured to determine whether the device 100 is presently a relay device. When the device is not a relay device, the device does not retransmit messages and may not make a determination as to whether a received message should be retransmitted. Thus, when the device 100 is not a relay device, the decision circuitry 130 is inactive and does not control the device. The relay ID circuitry 120 is configured to operate in three different modes: device collaborative mode, independent mode, and central control mode. The protocol converter circuitry 110 may be configured to identify or select a mode of operation and communicate the mode to the relay ID circuitry 120. Alternatively, the central device or node may communicate to devices within the cell controlled by the central device which mode of relay selection is in use.

Device Collaborative Mode

In many situations, it is beneficial for the devices to decide for themselves if they should re-transmit a message in another technology. In device collaborative mode, the devices within proximity of one another select a relay device without assistance from a central device or node (e.g., an eNB). Device collaborative mode operation may reduce latency and can be helpful in areas where connection to the central device is problematic or impossible. FIG. 3 outlines a method 300 that is performed by the relay ID circuitry 120 when operating in device collaborative mode. At 310, a change in operating environment is detected that triggers a selection of a relay device. For example, passage of a certain amount of time since the last time a relay device was selected may trigger a re-selection of a relay device. The amount of time may vary based on travel conditions, device speed, and so on. A relay device leaving a cooperative driving group or dropping out of proximity to the other devices in the group may trigger a re-selection of a relay device. A new device being detected in proximity to the group of devices may also trigger a re-selection of a relay device.

At 320, a determination is made by the device about the RATs that are supported by the other devices in the group. The RATs supported by devices in proximity to the device can be discovered via direct discovery procedures such as ProSe or WLAN direct discovery. The devices can announce the technology they support using the direct discovery procedure. One option for ProSe direct discovery is to reserve different codes for different V2X technologies, and when a device requests a temporary code to announce its services, the device will include a code in the request that represents the technologies the device supports, for example: Code 1 could designate LTE only, Code 2 could designate 5G only, Code 3 could designate DSRC and LTE, Code 4 could designate DSRC and 5G, Code 5 could designate LTE and 5G, Code 6 could designate DSRC and LTE and 5G, Code 7 could designate DSRC RSU, Code 8 could designate LTE RSU, and Code 7 could designate 5G RSU. If neighbor aware networking (NAN) is supported in all devices, then NAN can be used for announcing which technologies are supported, including DSRC only, multi fire, and any other communication standards.

Using the direct discovery process, the devices in proximity of one another can create a "map" of the environment, like the one shown in FIG. 1A in which the proximate devices are located spatially with respect to one another and the RAT capabilities of each device is known. At 330, a determination is made as to whether a number of RATs supported by the device is less than the number of RATs supported by another proximate device. If so, at 340, it is determined that the device is not the relay device. If the number of RATs supported by the device is not less than the number of RATs supported by another proximate device, at 350 a determination is made as to whether a number of RATs supported by the device is more than the number of RATs supported by all other proximate devices. If so, at 370 it is determined that the device is the relay device. If the number of RATs supported by the device is equal to the number of RATs supported by another proximate device, at 360 a determination is made as to whether some tiebreaker criterion is met.

For example, to evaluate the tiebreaker criterion, the device may randomly draw an integer number between 0 and 100 and if the number is less than X, the tiebreaker criterion is met and at 370 the device becomes the relay. This solution is not ideal as there is a chance of having zero or more than one relays. In another example, the tie breaker criterion is that the device with highest temporary identity becomes the relay. As all devices know the temporary identity of nearby devices, all devices will be able to evaluate the tiebreaker criterion. Only a single device will have the highest temporary identity, so there is guarantee of having only one device as the relay device in the area. Other factor that may be considered by the relay ID circuitry in device collaborative mode is the relative speed of the devices. For example, a device with a very high relative speed may not be selected while a device that is traveling the same speed as the devices around it may be selected as relay device over a stationary device that will eventually fall out of proximity to the group of moving devices.

Independent Mode

Figure 4:
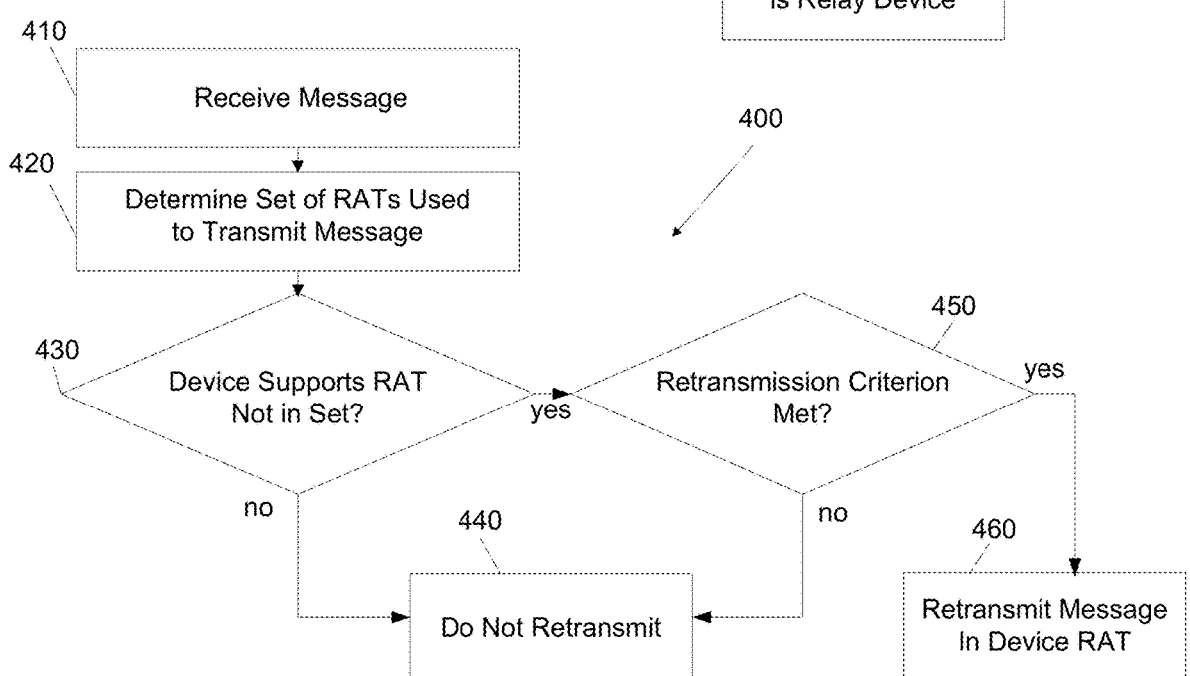
FIG. 4 illustrates an exemplary method that may be performed by a device when operating in an independent mode.

In independent mode, the relay ID circuitry 120 (FIG. 1) always determines that the device is a relay device. Thus, in independent mode, every time the device receives a message which was broadcast by another device, the decision circuitry 130 (FIG. 1) will decide whether or not the device should retransmit the message in a different technology. FIG. 4 outlines an exemplary method 400 that may be performed by the decision circuitry 130 for determining whether to retransmit a message in a different RAT. At 410, the method includes receiving a message and at 420 a set of RATs that has already been used to transmit the message is determined. Recall from FIG. 2 that the message includes information (e.g., in the header) the lists the set of RATs.

At 430 a determination is made as to whether the device supports RATs not in the set of RATs already used to transmit the message. If not, at 440, the device does not retransmit the message. If the device supports at least one RAT that is not in the set of RATs, at 450 a retransmission criterion is evaluated to determine if the device should retransmit the message. The retransmission criterion is used because if all devices receiving the message relayed the message in the same technology, then there may be too many transmissions, impacting the capacity of the air interface to support other messages at the same time.

One retransmission criterion is based on the device randomly retransmitting the message with certain probability P. The following procedure can be used: The device draws a random number between 0 and 1, and if the number is less than or equal to P, at 460 the device retransmits the message in one or more RATs that were not yet used for transmission. As shown in FIG. 2, the device updates the information in the message and adds the RATs that are being used for that transmission. All devices receiving a message do the same procedure with the random number drawing.

The value of P may be configured by the central device or core network and can be changed depending on channel conditions and number of devices and other factors. There is a tradeoff between the value of P and the probability that the candidate message is never transmitted in a given access technology. In that case, the devices that only support that RAT would not receive the message. If P is small, there is less chance of the message being retransmitted. If the value of P is large, then most devices will relay the candidate message in the other RAT. That will increase the likelihood of the message being received by single-mode devices, but at the same time it may cause too much overhead. For the case of P=1, all devices receiving the message will relay the candidate message in a different technology. The value of P may be adjusted based on context to achieve the optimized performance in different scenarios.

Another retransmission criterion is based on a random time interval. At 450, the device starts a random timer between zero and T. The device draws a random number between 0 and T, and that number becomes the wait timer or backoff timer. T should be less than or equal to any "time expiry value" at which the actual message would be no longer valid. While the timer is running, the device listens to the medium and checks if a different device sends the candidate message in a different technology. If yes, the device may stop the timer and the message is not retransmitted at 440. If the timer expires, the retransmits the message at 460. The device first updates the information on RATs in the message before sending the message.

All devices operating in independent mode that receive a message that was not broadcast in a RAT supported by the device do the same procedure with the random number drawing. The value of T is configured by the central device or core network and can be changed depending on channel conditions and number of devices and other factors. Both random time and random retransmission criteria may be used together.

In some examples, other or additional retransmission criteria may be considered by a device when determining whether to retransmit a message. For example, the message may include some of the following information: an initial position where the message was originally sent, radius of interest for the message, a time the device is broadcasting the message, time expiry, which is the time the message is no longer valid, or a sequence number, which uniquely identifies the message.

The decision circuitry 130 may check the initial position where the message was sent and the radius of interest, and based on that information decides if there is a need to relay the message. This can be done by checking the initial position plus the radius of interest (if present) and compare the device's own position at the time of message reception. Optionally, if the radius of interest is not present, the device may assume a given pre-configured radius (e.g. 300 m for DSRC, larger radios may be achieved with LTE and 5G V2X solutions).

Central Control Mode

Figures 5A, 5B:
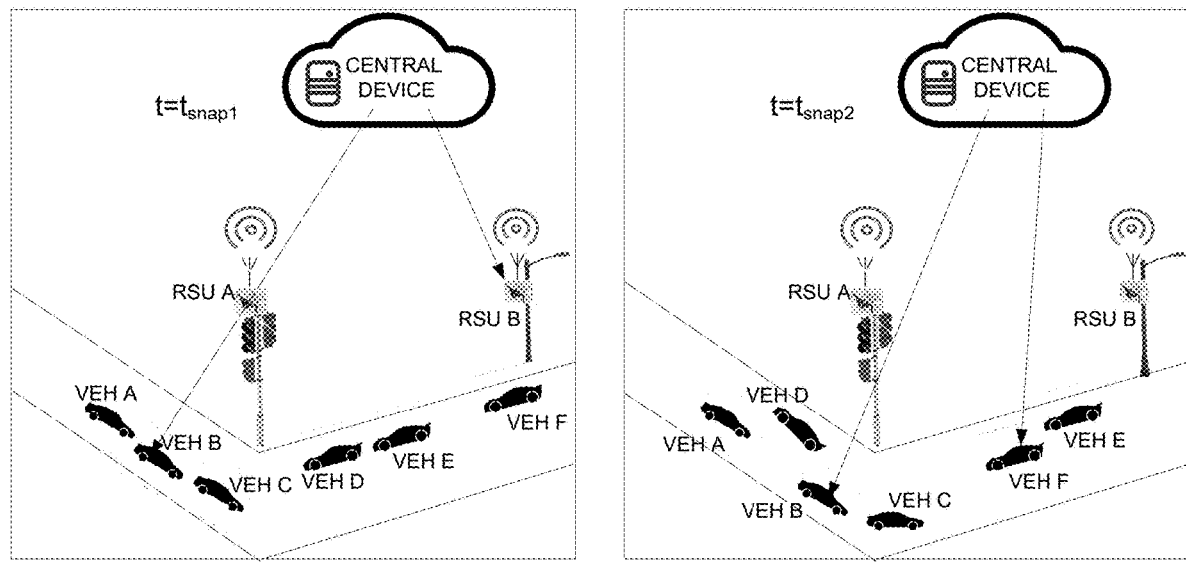
FIGS. 5A and 5B illustrate, schematically, a central control mode in which relay devices are selected in a V2X communication cell by a central device using a snapshot related technique.

In central control mode, a central device for a given cell selects the relay device(s) and transmits a selection message to any selected relay device. FIGS. 5A and 5B illustrate maps of a cell or area associated with a central device that controls some aspects of communication within the cell. The central device may be in communication with a traffic control server and/or a core network. The central device may be an eNB. The central node can be the eNB or an RSU or an edge server (MEC). The central node will receive information from the devices nearby and based on that information it will create a map of the environment at specific times. Note that the devices that support 3GPP LTE or 5G will be either in connected mode or camped in the cell in idle mode.

The map illustrated in FIG. 5A depicts a position of devices in the cell at a time $t_{snap1}$ while the map illustrated in FIG. 5B depicts a position of the devices in the cell at a time $t_{snap2}$. In central control mode, the central device selects one or more relay devices within its cell based on a "snapshot" of the positions of devices in the cell. After each snapshot, the central device selects new relay devices (or maintains the same relay devices). In order for the central to select relay devices in its area, the following information may to be taken into consideration by the central device: the technologies supported by the device (DSRC, LTE V2X, 5G V2X), the device's location, the device speed, the devices that are in proximity of that device (i.e., all other devices that are able to communicate with this device).

The central device is capable of combining the location information as well as other network measurements, with other types of information (e.g. maps, detailed street/road maps, signal strength received from devices, maximum number of radios supported in the device, direction of travel of the device, and so on) to try to narrow down which devices should communicate with each other in a given area for a given type of V2X message. For instance, if the central node can map the location of devices to a given highway direction of traffic, it could select a couple of relay devices along the highway. Once the central has the complete information of the environment (i.e., the map or snapshot), the central device can then select a few devices in the cell to be relay devices.

As can be seen in FIGS. 5A and 5B, the map changes with time as the devices move around. The central device takes a "snapshot" of this dynamic map, and assumes it is mostly static for the next few ms. For instance the central device may assume that for the next 500 ms the vehicles will not move a substantial amount relative to each other. Therefore a decision to choose the relay device can be done assuming this snapshot, and when the 500 ms expires, the central device may take another snapshot of the environment and select a new relay device. FIGS. 5A and 5B show consecutive snapshots where the central device chooses 2 relays for a given area/intersection. The relay selection decision may be taken periodically and the update time (e.g. 500 ms in this example) may be adjusted according to the expected environment conditions and context (e.g. in a traffic jam vehicles move much slower and the selection of relay devices may happen at longer intervals).

The map of the environment may not include devices that support only DSRC as those devices do not communicate with the eNB or 3GPP RSU. However, the central device does not need to know the positions of such DSRC-only vehicles—as long as the relay devices are spread so that each relay device covers a given region, then all vehicles in that region would be able to hear the relay device. The central device may, however, still be able to learn about DSRC-only vehicles via reporting from 3GPP devices that are able to communicate with those DSRC-only vehicles and can provide this information. Optionally, a DSRC RSU may know about DSRC-only vehicles and may provide that information to the 3GPP central device.

There is a tradeoff between the length of the update interval X, where it is assumed that the environment is static, and the number of computations and communication required. If X is long, then there are less computations required to be done to choose and less communication overhead to inform the relay (less relay re-selections), but the snapshot may not be so accurate, and the best relay devices may not be chosen. If X is short, then there may be too many reselections and too much signaling overhead to notify the devices that that device is chosen as relay device. The optimal value for X depends on the device speeds, device density, road design, and traffic conditions.

Figure 6:
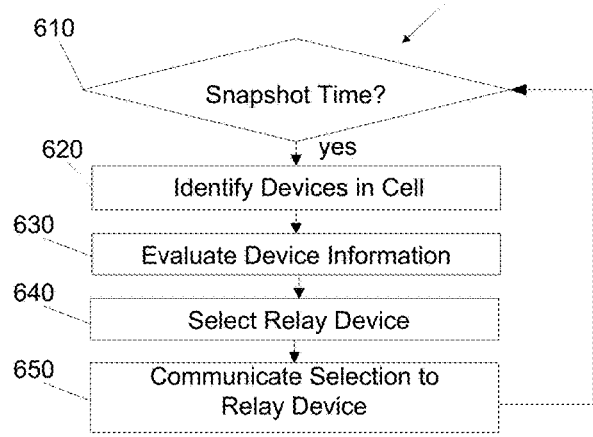
FIG. 6 illustrates an exemplary method that may be used by the central device of FIGS. 5A and 5B to select one or more relay devices for a cell.

FIG. 6 illustrates a flow diagram outlining an exemplary method 600 that may be performed by a central device to select a relay device in a cell. At 610, it is determined that a snapshot period has expired. At 620, the method includes identifying a group of devices that are proximate one another; and at 630 evaluating device information about each of the devices. Based at least on the evaluation, at 640 one of the devices in the group is selected to be a relay device that re-transmits messages received by the relay device in one or more RATs in which the messages were not originally transmitted. At 650, a selection message is transmitted to the relay device that communicates to the relay device that the relay device is designated relay device for a next snapshot period.

It can be seen from the foregoing description that the relay device identification and selective retransmission techniques described herein increase the likelihood that all devices will receive V2X messages.

Example Device

Figure 7:
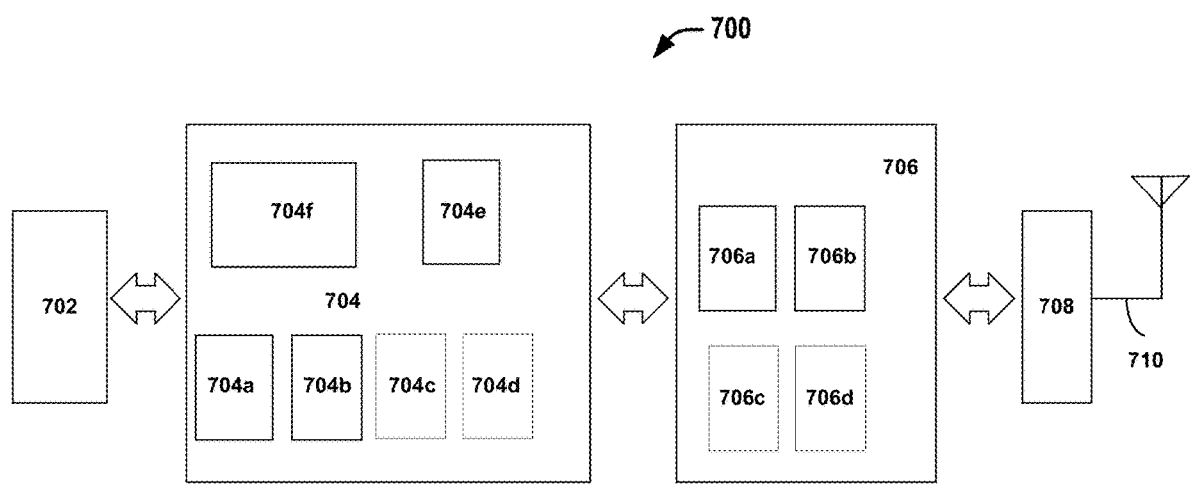
FIG. 7 illustrates example components of a device, according to one embodiment of the disclosure.

Embodiments described herein may be implemented into a system using any suitably configured hardware and/or software. FIG. 7 illustrates, for one embodiment, example components of a device 700. The device 700 may be utilized as a User Equipment (UE) device or an evolved node B (eNB) device or E-UTRAN equipment. In some embodiments, the device 700 may include application circuitry 702, baseband circuitry 704, Radio Frequency (RF) circuitry 706, front-end module (FEM) circuitry 708 and one or more antennas 710, coupled together at least as shown.

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications, such as a VMIMO application as described and/or operating systems to run on the system.

The baseband circuitry 704 may include circuitry such as, but not limited to, one or more single-core or multi-core processors. The baseband circuitry 704 may include one or more baseband processors and/or control logic to process baseband signals received from a receive signal path of the RF circuitry 706 and to generate baseband signals for a transmit signal path of the RF circuitry 706. Baseband processing circuity 704 may interface with the application circuitry 702 for generation and processing of the baseband signals and for controlling operations of the RF circuitry 706. For example, in some embodiments, the baseband circuitry 704 may include a second generation (2G) baseband processor 704a, third generation (3G) baseband processor 704b, fourth generation (4G) baseband processor 704c, and/or other baseband processor(s) 704d for other existing generations, generations in development or to be developed in the future (e.g., fifth generation (5G), 6G, etc.).

The baseband circuitry 704 (e.g., one or more of baseband processors 704a-d) may handle various radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, and/or constellation mapping/demapping functionality. In some embodiments, encoding/decoding circuitry of the baseband circuitry 704 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 704e of the baseband circuitry 704 may be configured to run elements of the protocol stack for signaling of the PHY, MAC, RLC, PDCP and/or RRC layers. In some embodiments, the baseband circuitry may include one or more audio digital signal processor(s) (DSP) 704f. The audio DSP(s) 704f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the RF circuitry 706 may include a receive signal path and a transmit signal path. The receive signal path of the RF circuitry 706 may include mixer circuitry 706a, amplifier circuitry 706b and filter circuitry 706c. The transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 704 and may be filtered by filter circuitry 706c. The filter circuitry 706c may include a low-pass filter (LPF), although the scope of the embodiments is not limited in this respect.

In some embodiments, the mixer circuitry 706a of the receive signal path and the mixer circuitry 706a of the transmit signal path may include two or more mixers and may be arranged for quadrature downconversion and/or upconversion respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a may be arranged for direct downconversion and/or direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider.

The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer.

In some embodiments, frequency input may be provided by a voltage controlled oscillator (VCO), although that is not a requirement. Divider control input may be provided by either the baseband circuitry 704 or the applications processor 702 depending on the desired output frequency. In some embodiments, a divider control input (e.g., N) may be determined from a look-up table based on a channel indicated by the applications processor 702.

Synthesizer circuitry 706*d* of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 706*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. FEM circuitry 708 may also include a transmit signal path which may include circuitry configured to amplify signals for transmission provided by the RF circuitry 706 for transmission by one or more of the one or more antennas 710. When used in a device, FEM circuitry 708 may also include a transmit and receive path for device-to-device communications received directly from another device, without traveling through the E-UTRAN (e.g. Device-to-device interface circuitry). When used in a device, FEM circuitry 708 may also include a transmit and receive path for cellular communications received from the eNB or E-UTRAN (e.g. cellular interface circuitry).

In some embodiments, the FEM circuitry 708 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission (e.g., by one or more of the one or more antennas 710.

In some embodiments, the device 700 may include additional elements such as, for example, memory/storage, display, camera, sensor, and/or input/output (I/O) interface.

While the systems, circuitry and methods have been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Example 1 is device including protocol converter circuitry. The protocol converter circuitry includes decision circuitry configured to: analyze a message received by the device to determine a set of radio access technologies (RATs) in which the message is transmitted; and if the device supports a device RAT that is different from the set of RATS: update the message to include the device RAT; and instruct the device to transmit the updated message using the RAT.

Example 2 includes the subject matter of example 1, including or excluding optional elements, wherein the decision circuitry is configured to read a header field in the message that includes data describing the set of RATs.

Example 3 includes the subject matter of examples 1-2, including or excluding optional elements, wherein the protocol converter circuitry further includes relay identification (ID) circuitry configured to determine whether the device is a relay device.

Example 4 includes the subject matter of example 3, including or excluding optional elements, wherein the relay ID circuitry is configured to determine that the device is a relay device in response to a communication from another device that designates the device as a relay device.

Example 5 includes the subject matter of example 3, including or excluding optional elements, wherein the relay ID circuitry is configured to: identify a group of devices proximate the device; discover a set of supported RATs supported by the group of devices; determine that the device is the relay device if the device supports more RATs than the group of devices.

Example 6 includes the subject matter of example 5, including or excluding optional elements, wherein the relay ID circuitry is configured to discover the set of supported RATs by analyzing discovery messages broadcast by the group of devices, wherein each discovery message includes data that identifies the RATs supported by a device that sent the discovery message.

Example 7 includes the subject matter of example 5, including or excluding optional elements, wherein the relay ID circuitry is configured to, in response to determining that the device and a second device of the group of devices support a same set of RATs: identify a temporary ID number assigned to the second device; and compare the temporary ID number of the second device to a temporary ID number of the device; and determine that the device is the relay device if the temporary ID number of the second device is less than the temporary ID number of the device.

Example 8 includes the subject matter of examples 1-2, including or excluding optional elements, wherein the decision circuitry is configured to, if the device supports a device RAT that is different from the set of RATS: evaluate retransmission criterion; if the retransmission is met: update the message to include the device RAT; and instruct the device to transmit the message using the device RAT; and if the retransmission criterion is not met, no retransmit of the message is instructed by the device.

Example 9 includes the subject matter of example 8, including or excluding optional elements, wherein the decision circuitry is configured to evaluate the retransmission criterion by: generating a random number; comparing the random number to a predetermined number; and determining whether the retransmission criterion is met if the random number is less than the predetermined number.

Example 10 includes the subject matter of example 8, including or excluding optional elements, wherein the decision circuitry is configured to evaluate the retransmission criterion by: generating a random number; for a time period defined by the random number, monitoring a channel to determine if the message is transmitted by another device using the device RAT; and if the message is not transmitted using the device RAT during the time period, determining that the retransmission criterion is met.

Example 11 is a computer-readable storage device storing computer-executable instructions that, in response to execution, cause a processor to: determine that a snapshot period has expired; identify a group of devices that are proximate one another; evaluate device information of a group of devices; based at least on the evaluation, select a device in the group of devices to be a relay device that re-transmits messages in one or more RATs that is different from a RAT in which the messages were originally transmitted; and transmit a selection message to the relay device to designate the device as the relay device for a next snapshot period.

Example 12 includes the subject matter of example 11, including or excluding optional elements, wherein the instructions include instructions that, in response to execution, cause the processor to determine a duration of the snapshot period based at least on an average speed of travel of the group of devices.

Example 13 includes the subject matter of examples 11-12, including or excluding optional elements, wherein the device information includes respective sets of RATs supported by respective devices in the group, and further wherein the instructions include instructions that, in response to execution, cause the processor to designate a device having the largest set of RATs as the relay device.

Example 14 includes the subject matter of examples 11-12, including or excluding optional elements, wherein the device information includes a relative speed of the devices.

Example 15 is a method configured to selectively retransmit a message, including: analyzing a message received by a device to determine a set of radio access technologies (RATs) in which the message is transmitted; and if the device supports one or more device RATs that is different from the set of RATs: updating the message to include the device RAT; and transmitting the updated message using the device RAT.

Example 16 includes the subject matter of example 15, including or excluding optional elements, including reading a header field in the message that includes data describing the set of RATs.

Example 17 includes the subject matter of examples 15-16, including or excluding optional elements, including determining whether the device is a relay device and if the device is not a relay device, no retransmit of the message is performed.

Example 18 includes the subject matter of example 17, including or excluding optional elements, including determining that the device is a relay device in response to a communication from another device that designates the device as a relay device.

Example 19 includes the subject matter of example 17, including or excluding optional elements, including identifying a group of devices proximate the device; discovering a set of supported RATs supported by the respective devices in the group; determining that the device is the relay device if the device supports more RATs than the group of devices.

Example 20 includes the subject matter of example 17, including or excluding optional elements, including, in response to determining that the device and a second device of the set of devices support a same set of RATs: identifying a temporary ID number assigned to the second device; and comparing the temporary ID number of the second device to a temporary ID number of the device; and determining that the device is the relay device if the temporary ID number of the second device is less than the temporary ID number of the device.

Example 21 includes the subject matter of examples 15-16, including or excluding optional elements, including, if the device supports a device RAT that is different from the set of RATS: evaluating retransmission criterion; if the retransmission is met: updating the message to include the device RAT; and transmitting the message using the device RAT; and if the retransmission criterion is not met, no retransmit of the message is performed.

Example 22 includes the subject matter of example 21, including or excluding optional elements, including evaluating the retransmission criterion by: generating a random number; comparing the random number to a predetermined number; and determining whether the retransmission criterion is met if the random number is less than the predetermined number.

Example 23 includes the subject matter of example 21, including or excluding optional elements, including evaluating the retransmission criterion by: generating a random number; for a time period defined by the random number, monitoring a channel to determine if the message is transmitted by another device using the device RAT; and if the message is not transmitted using the device RAT during the time period, determining that the retransmission criterion is met.

Example 24 is an apparatus configured to selectively retransmit a message, including: means for analyzing a message received by a device to determine a set of radio access technologies (RATs) in which the message is transmitted; and means for updating the message to include the device RAT if the device supports a device RAT that is different from set of RATS; and means for transmitting the updated message using the device RAT.

Example 25 includes the subject matter of example 24, including or excluding optional elements, including means for determining whether the device is a relay device and wherein if the device is not a relay device, no retransmit of the message is performed.

Example 26 is a method, including: determining that a snapshot period has expired; identifying a group of devices that are proximate one another; evaluating device information of each of the group of devices; based at least on the evaluation, selecting a device in the group of devices as a relay device that re-transmits messages in one or more RATs that is different from a set of RATs in which the messages were originally transmitted; and transmitting a selection message to the relay device to designate the device as the relay device for a next snapshot period.

Example 27 includes the subject matter of example 26, including or excluding optional elements, including determining a duration of the snapshot period based at least on an average speed of travel of the devices.

Example 28 includes the subject matter of examples 26-27, including or excluding optional elements, wherein the device information includes respective sets of RATs supported by respective devices in the group, and further wherein the method includes a device having the largest set of RATs as the relay device.

Example 29 includes the subject matter of examples 26-27, including or excluding optional elements, wherein the device information includes a relative speed of the devices.

The invention claimed is:

1. A device for relaying communication in a multiple radio access technology (RAT) environment, comprising:
  protocol converter circuitry comprising:
    decision circuitry configured to
      analyze a message received by the device to determine a set of RATs in which the message is transmitted, wherein the message includes data indicating RATs in which the message is transmitted; and
      if the device supports a device RAT that is different from the set of RATs:
        update the data in the message to further indicate include the device RAT; and
        instruct the device to transmit the updated message using the device RAT.

2. The device of claim 1, wherein the decision circuitry is configured to read a header field in the message that includes data describing the set of RATs.

3. The device of claim 1, wherein the protocol converter circuitry further comprises relay identification (ID) circuitry configured to determine whether the UE device is a relay device.

4. The device of claim 3, wherein the relay ID circuitry is configured to determine that the device is a relay device in response to a communication from another device that designates the device as a relay device.

5. The device of claim 3, wherein the relay ID circuitry is configured to:
  identify a group of devices proximate the device;
  discover a set of supported RATs supported by the group of devices;
  determine that the device is the relay device if the device supports more RATs than the group of devices.

6. The device of claim 5, wherein the relay ID circuitry is configured to discover the set of supported RATs by analyzing discovery messages broadcast by the group of devices, wherein each discovery message includes data that identifies the RATs supported by a device that sent the discovery message.

7. The device of claim 5, wherein the relay ID circuitry is configured to, in response to determining that the device and a second device in the group of devices support a same set of RATs:
  identify a temporary ID number assigned to the second device; and
  compare the temporary ID number of the second device to a temporary ID number of the device; and
  determine that the device is the relay device if the temporary ID number of the second device is less than the temporary ID number of the device.

8. The device of claim 1, wherein the decision circuitry is configured to, if the device supports a device RAT that is different from the set of RATs:
  evaluate retransmission criterion;
  if the retransmission is met:
    update the message to include the device RAT; and
    instruct the device to transmit the message using the device RAT; and
  if the retransmission criterion is not met, no retransmit of the message is instructed by the device.

9. The device of claim 8, wherein the decision circuitry is configured to evaluate the retransmission criterion by:
  generating a random number;
  comparing the random number to a predetermined number; and
  determining whether the retransmission criterion is met if the random number is less than the predetermined number.

10. The device of claim 8, wherein the decision circuitry is configured to evaluate the retransmission criterion by:
  generating a random number;
  for a time period defined by the random number, monitoring a channel to determine if the message is transmitted by another device using the device RAT; and
  if the message is not transmitted using the device RAT during the time period, determining that the retransmission criterion is met.

11. A method configured to selectively retransmit a message, comprising:
  analyzing a message received by a device to determine a set of radio access technologies (RATs) in which the message is transmitted, wherein the message includes data indicating RATs in which the message is transmitted; and
  if the device supports a device RAT that is different from the set of RATs:
    updating the data in the message to further indicate the device RAT; and
    transmitting the updated message using the device RAT.

12. The method of claim 11, comprising reading a header field in the message that includes data describing the set of RATs.

13. The method of claim 11, further comprising determining whether the device is a relay device and if the device is not a relay device, no retransmit of the message is performed.

14. The method of claim 13, further comprising determining that the device is a relay device in response to a communication from another device that designates the device as a relay device.

15. The method of claim 13, further comprising:
  identifying a group of devices proximate the device;
  discovering a set of supported RATs supported by the respective devices in the group;

determining that the device is the relay device if the device supports more RATs than the group of devices.

16. The method of claim 13, further comprising, in response to determining that the device and a second device of the group of devices support a same set of RATs:
- identifying a temporary ID number assigned to the second device; and
- comparing the temporary ID number of the second device to a temporary ID number of the device; and
- determining that the device is the relay device if the temporary ID number of the second device is less than the temporary ID number of the device.

17. The method of claim 11, further comprising, if the device supports a device RAT that is different from the set of RATs:
- evaluating retransmission criterion;
- if the retransmission is met:
  - updating the message to include the device RAT; and
  - transmitting the message using the device RAT; and
- if the retransmission criterion is not met, no retransmit of the message is performed.

18. The method of claim 17, further comprising evaluating the retransmission criterion by:
- generating a random number;
- comparing the random number to a predetermined number; and
- determining whether the retransmission criterion is met if the random number is less than the predetermined number.

19. The method of claim 17, further comprising evaluating the retransmission criterion by:
- generating a random number;
- for a time period defined by the random number, monitoring a channel to determine if the message is transmitted by another device using the device RAT; and
- if the message is not transmitted using the device RAT during the time period, determining that the retransmission criterion is met.

* * * * *